(12) United States Patent
Hackett

(10) Patent No.: US 6,357,705 B1
(45) Date of Patent: Mar. 19, 2002

(54) ADJUSTABLE ROLLER STAND

(76) Inventor: Ronny Hackett, 3654 Denver, Long Beach, CA (US) 90810

( * ) Notice: Subject to any disclaimer, the term of this patent is extended or adjusted under 35 U.S.C. 154(b) by 0 days.

(21) Appl. No.: 09/557,198

(22) Filed: Apr. 21, 2000

(51) Int. Cl.$^7$ .............................................. F16M 11/00
(52) U.S. Cl. .................................... 248/163.2; 248/127
(58) Field of Search ........................... 248/125.1, 125.8, 248/354.1, 351, 676, 670, 163.2; 182/182.1, 181.1, 182.5, 224; 144/287, 286.1; 269/289 MR, 242; 193/42, 35 TE, 35 SS; 198/828; 52/149

(56) References Cited

U.S. PATENT DOCUMENTS

| | | | | |
|---|---|---|---|---|
| 1,044,816 A | * | 11/1912 | Phillipson | 193/42 |
| 2,633,221 A | * | 3/1953 | Roeder | 193/35 R |
| 4,031,981 A | * | 6/1977 | Spencer | 182/182.1 |
| 4,524,864 A | * | 6/1985 | Peterson, II | 198/828 |
| 4,715,488 A | * | 12/1987 | Hewitt et al. | 193/35 R |
| 5,299,656 A | * | 4/1994 | Grill | 182/186.4 |
| 5,487,445 A | * | 1/1996 | Biehl | 182/181.1 |
| 5,884,681 A | * | 3/1999 | Nickles | 144/329 |
| 6,086,061 A | * | 7/2000 | Vedoy et al. | 198/810.02 |

* cited by examiner

Primary Examiner—Anita King
Assistant Examiner—Gwendolyn Baxter
(74) Attorney, Agent, or Firm—Goldstein Law Offices, P.C.

(57) ABSTRACT

An adjustable roller stand including a base member comprised of a pair of horizontal supports positionable upon a recipient surface. The base member includes a pair of vertical supports. The pair of vertical supports extend upwardly from the pair of horizontal supports. Each of the pair of vertical supports is defined by a pair of vertical members having a channel disposed therebetween. A pair of sliding supports are slidably received within the channels between the pair of vertical members of the vertical supports of the base member. The sliding supports each have a free upper end. A fixed support shelf is secured to and extends between the pair of vertical supports of the base member. A sliding support shelf is secured to and extends between the free upper ends of the pair of sliding supports. The sliding support shelf is disposed above the fixed support shelf. A lifting mechanism is secured between the fixed support shelf and the sliding support shelf. The lifting mechanism has an upper portion secured to the sliding support shelf and a lower portion secured to the fixed support shelf.

6 Claims, 2 Drawing Sheets

ADJUSTABLE ROLLER STAND

BACKGROUND OF THE INVENTION

The present invention relates to an adjustable roller stand and more particularly pertains to adjusting stock height to correspond with a height of a mill sander or the like.

The use of adjustable stands is known in the prior art. More specifically, adjustable stands heretofore devised and utilized for the purpose of supporting objects at predetermined heights are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe an adjustable roller stand for adjusting stock height to correspond with a height of a mill sander or the like.

In this respect, the adjustable roller stand according to the present invention substantially departs from the conventional concepts and designs of the prior art, and in doing so provides an apparatus primarily developed for the purpose of adjusting stock height to correspond with a height of a mill sander or the like.

Therefore, it can be appreciated that there exists a continuing need for a new and improved adjustable roller stand which can be used for adjusting stock height to correspond with a height of a mill sander or the like. In this regard, the present invention substantially fulfills this need.

SUMMARY OF THE INVENTION

In the view of the foregoing disadvantages inherent in the known types of adjustable stands now present in the prior art, the present invention provides an improved adjustable roller stand. As such, the general purpose of the present invention, which will be described subsequently in greater detail, is to provide a new and improved adjustable roller stand which has all the advantages of the prior art and none of the disadvantages.

To attain this, the present invention essentially comprises a base member comprised of a pair of horizontal supports positionable upon a recipient surface. The pair of horizontal supports are disposed in a spaced and parallel relationship. The horizontal supports each have opposed ends. Each opposed end has an anchor coupled thereto for coupling the base member to the recipient surface. The base member includes a pair of vertical supports. The pair of vertical supports extend upwardly from the pair of horizontal supports. Each of the pair of vertical supports is defined by a pair of vertical members having a channel disposed therebetween. A pair of sliding supports are slidably received within the channels between the pair of vertical members of the vertical supports of the base member. The sliding supports each have a free upper end. A fixed support shelf is secured to and extends between the pair of vertical supports of the base member. A sliding support shelf is secured to and extends between the free upper ends of the pair of sliding supports. The sliding support shelf is disposed above the fixed support shelf. The sliding support shelf has a pair of rollers secured thereto. A scissor jack is secured between the fixed support shelf and the sliding support shelf. The scissor jack has an upper portion secured to the sliding support shelf and a lower portion secured to the fixed support shelf.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable roller stand which has all the advantages of the prior art adjustable stands and none of the disadvantages.

It is another object of the present invention to provide a new and improved adjustable roller stand which may be easily and efficiently manufactured and marketed.

It is a further object of the present invention to provide a new and improved adjustable roller stand which is of durable and reliable construction.

An even further object of the present invention is to provide a new and improved adjustable roller stand which is susceptible of a low cost of manufacture with regard to both materials and labor, and which accordingly is then susceptible of low prices of sale to the consuming public, thereby making such an adjustable roller stand economically available to the buying public.

Even still another object of the present invention is to provide a new and improved adjustable roller stand for adjusting stock height to correspond with a height of a mill sander or the like.

Lastly, it is an object of the present invention to provide a new and improved adjustable roller stand including a base member comprised of a pair of horizontal supports positionable upon a recipient surface. The base member includes a pair of vertical supports. The pair of vertical supports extend upwardly from the pair of horizontal supports. Each of the pair of vertical supports is defined by a pair of vertical members having a channel disposed therebetween. A pair of sliding supports are slidably received within the channels between the pair of vertical members of the vertical supports of the base member. The sliding supports each have a free upper end. A fixed support shelf is secured to and extends between the pair of vertical supports of the base member. A sliding support shelf is secured to and extends between the free upper ends of the pair of sliding supports. The sliding support shelf is disposed above the fixed support shelf. A lifting mechanism is secured between the fixed support shelf and the sliding support shelf. The lifting mechanism has an upper portion secured to the sliding support shelf and a lower portion secured to the fixed support shelf.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
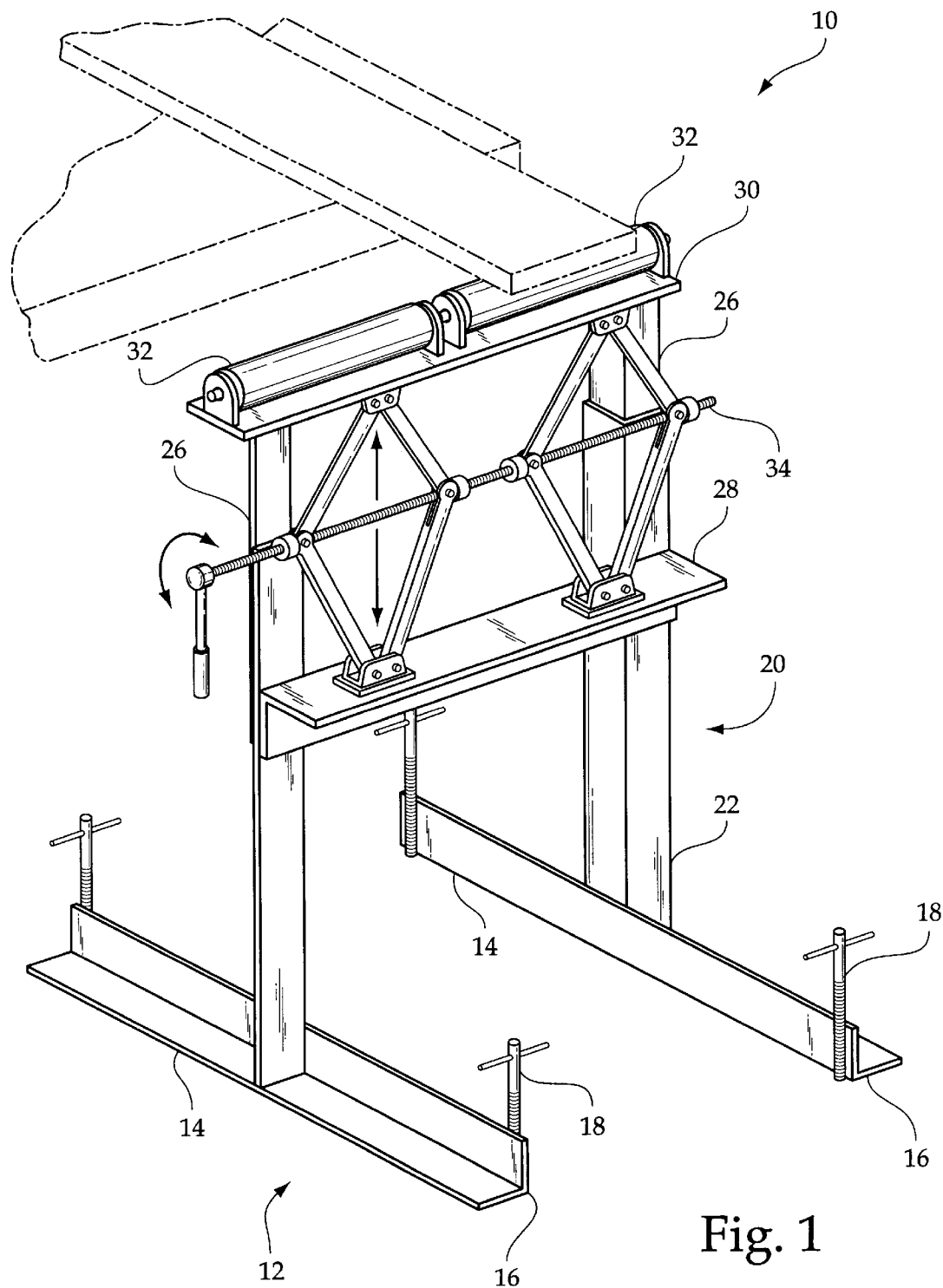
FIG. 1 is a perspective view of the preferred embodiment of the adjustable roller stand constructed in accordance with the principles of the present invention.
Figure 2:
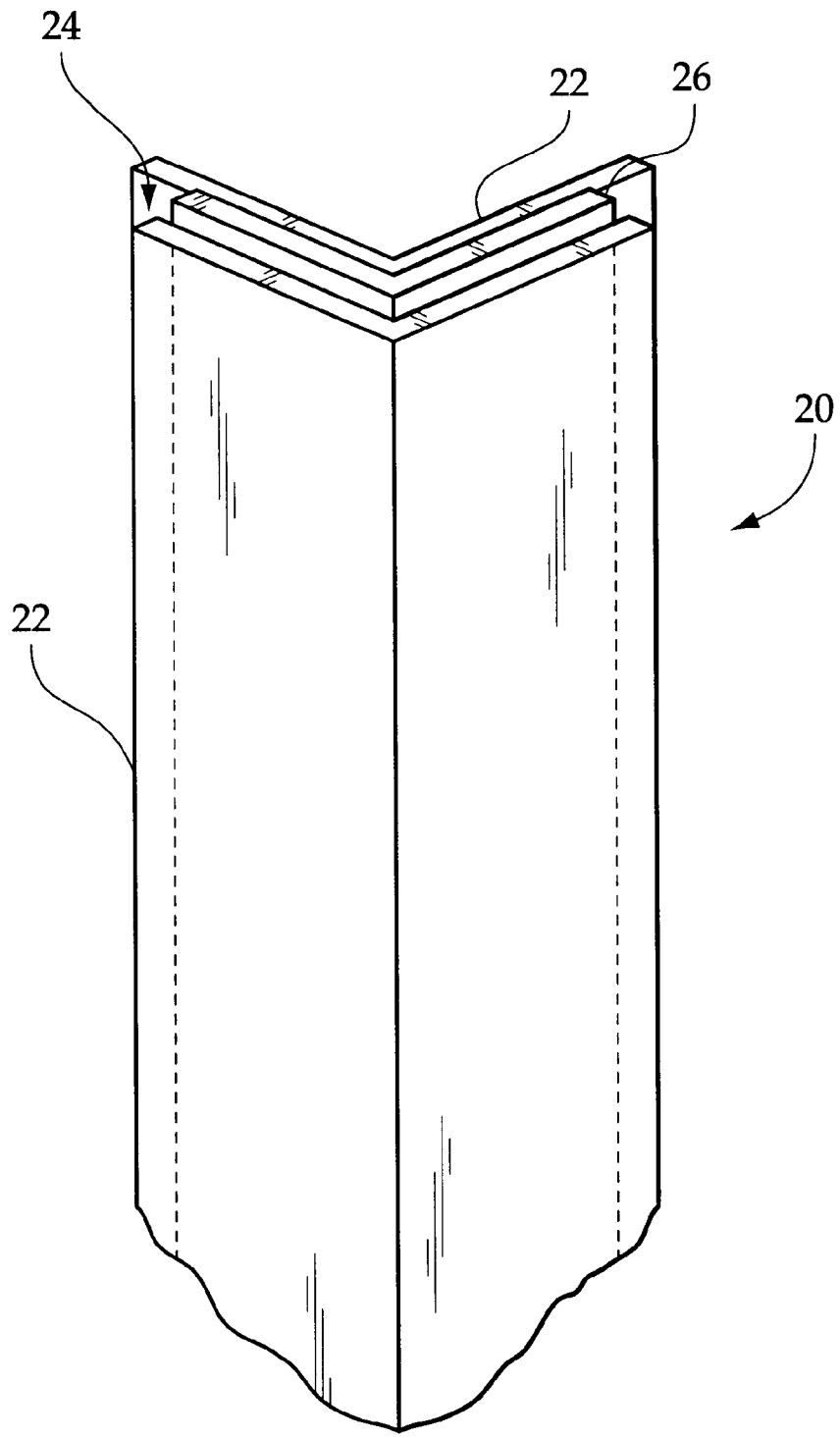
FIG. 2 is a detailed view of the channel.

With reference now to the drawings, and in particular, to FIG. 1 thereof, the preferred embodiment of the new and improved adjustable roller stand embodying the principles and concepts of the present invention and generally designated by the reference number 10 will be described.

Specifically, it will be noted in FIG. 1 that the device relates to an adjustable roller stand for adjusting stock height to correspond with a height of a mill sander or the like. In its broadest context, the device consists of a base member, a pair of sliding supports, a fixed support shelf, a sliding support shelf, and a scissor jack. Such components are individually configured and correlated with respect to each other so as to attain the desired objective.

The base member 12 is comprised of a pair of horizontal supports 14 positionable upon a recipient surface. The pair of horizontal supports 14 are disposed in a spaced and parallel relationship. The horizontal supports 14 each have opposed ends 16. Each opposed end 16 has an anchor 18 coupled thereto for coupling the base member 12 to the recipient surface. The type of anchor 18 used will depend upon the composition of the recipient surface. The base member 12 includes a pair of vertical supports 20. The pair of vertical supports 20 extend upwardly from the pair of horizontal supports 14. Each of the pair of vertical supports 20 is defined by a pair of vertical members 22 having a channel 24 disposed therebetween.

The pair of sliding supports 26 are slidably received within the channels 24 between the pair of vertical members 22 of the vertical supports 20 of the base member 12. The sliding supports 26 each have a free upper end.

The fixed support shelf 28 is secured to and extends between the pair of vertical supports 20 of the base member 12.

The sliding support shelf 30 is secured to and extends between the free upper ends of the pair of sliding supports 26. The sliding support shelf 30 is disposed above the fixed support shelf 28. The sliding support shelf 30 has a pair of rollers 32 secured thereto. In use, the sliding support shelf 30 will be positioned whereby the pair of rollers 32 are at a height equal to the level of the height of the mill sander or other work surface.

The scissor jack 34 is secured between the fixed support shelf 28 and the sliding support shelf 30. The scissor jack 34 has an upper portion secured to the sliding support shelf 30 and a lower portion secured to the fixed support shelf 28. The scissor jack 34 will raise or lower the sliding support shelf 30 to the desired height where the rollers 32 are at a height equal to the work surface. The scissor jack 34, when in operation, will cause the sliding support shelf 34 to move up or down whereby the sliding supports 26 will slide with respect to the channel 24 of the pair of vertical supports 20. It should be noted that other types of lifting mechanisms could be used in place of the scissor jack 34 or the device 10 could be adapted for use without the use of any type of lifting mechanism.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable roller stand for adjusting stock height to correspond with a height of a mill sander comprising, in combination:

a base member comprised of a pair of horizontal supports positionable upon a recipient surface, the pair of horizontal supports being disposed in a spaced and parallel relationship, the horizontal supports each having opposed ends, each opposed end having an anchor coupled thereto for coupling the base member to the recipient surface, the base member including a pair of vertical supports, the pair of vertical supports extending upwardly from the pair of horizontal supports, each of the pair of vertical supports being defined by a pair of vertical members having a channel disposed therebetween;

a pair of sliding supports slidably received within the channels between the pair of vertical members of the vertical supports of the base member, the sliding supports each having a free upper end;

a fixed support shelf secured to and extending between the pair of vertical supports of the base member;

a sliding support shelf secured to and extending between the free upper ends of the pair of sliding supports, the sliding support shelf being disposed above the fixed support shelf, the sliding support shelf having a pair of rollers secured thereto;

a scissor jack secured between the fixed support shelf and the sliding support shelf, the scissor jack having an upper portion secured to the sliding support shelf and a lower portion secured to the fixed support shelf.

2. An adjustable roller stand for adjusting stock height to correspond with a height of a mill sander comprising, in combination:

a base member comprised of a pair of horizontal supports positionable upon a recipient surface, the base member including a pair of vertical supports, the pair of vertical supports extending upwardly from the pair of horizontal supports, each of the pair of vertical supports being defined by a pair of vertical members having a channel disposed therebetween;

a pair of sliding supports slidably received within the channels between the pair of vertical members of the vertical supports of the base member, the sliding supports each having a free upper end;

a fixed support shelf secured to and extending between the pair of vertical supports of the base member;

a sliding support shelf secured to and extending between the free upper ends of the pair of sliding supports, the sliding support shelf being disposed above the fixed support shelf;

a lifting mechanism secured between the fixed support shelf and the sliding support shelf, the lifting mechanism having an upper portion secured to the sliding support shelf and a lower portion secured to the fixed support shelf.

3. The adjustable roller stand as set forth in claim 2 wherein the pair of horizontal supports of the base member are disposed in a spaced and parallel relationship.

4. The adjustable roller stand as set forth in claim 2 wherein the horizontal supports each have an anchor coupled thereto for coupling the base member to the recipient surface.

5. The adjustable roller stand as set forth in claim 2 wherein the sliding support shelf has a pair of rollers secured thereto.

6. The adjustable roller stand as set forth in claim 2 wherein the lifting mechanism is a jack.

* * * * *